United States Patent Office 2,804,321
Patented Aug. 27, 1957

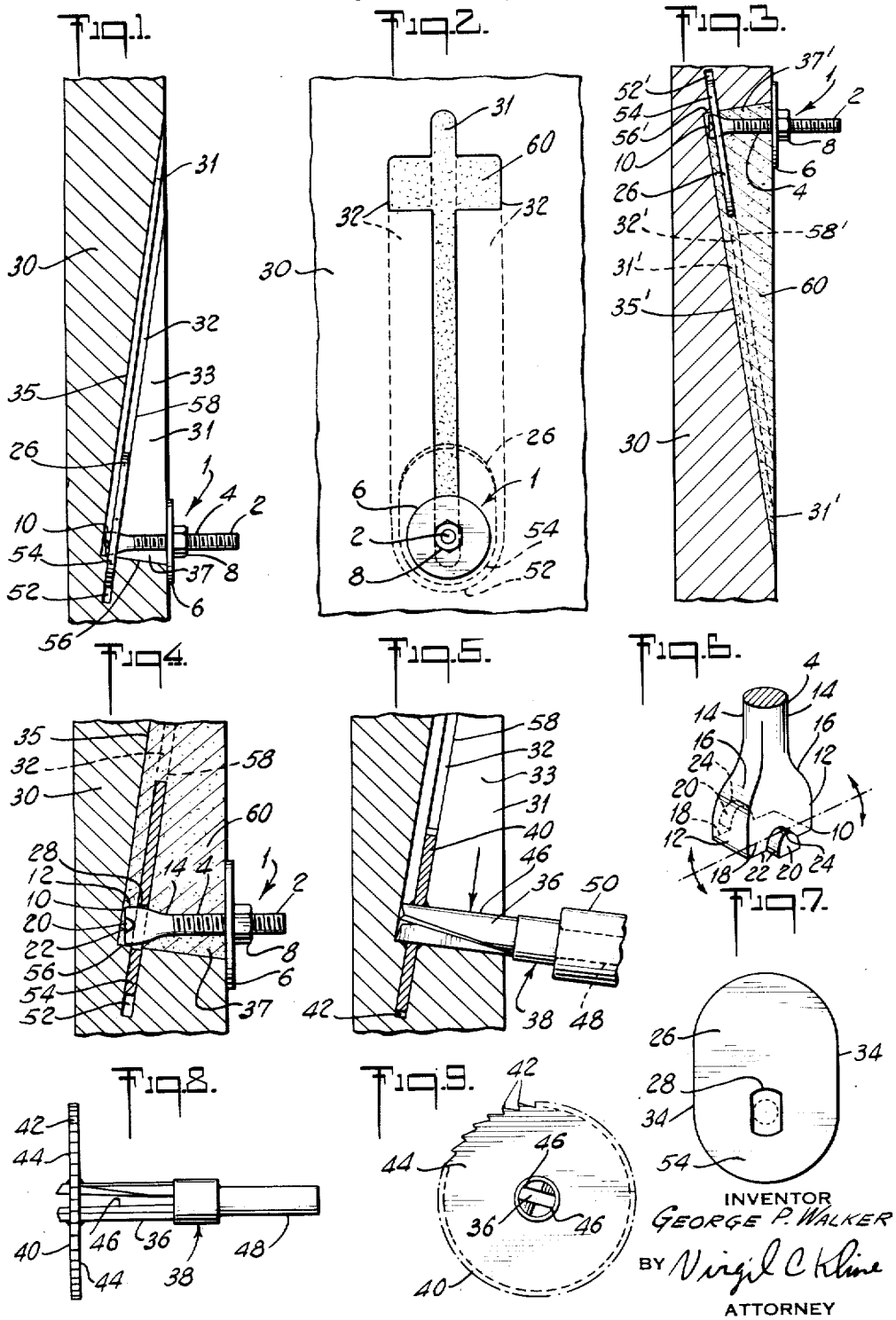

2,804,321

MEANS FOR SUPPORTING ARTICLES ON WALL PANELS

George P. Walker, Montrose, N. Y., assignor to Johns-Manville Corporation, New York, N. Y., a corporation of New York Application February 26, 1953, Serial No. 339,018

6 Claims. (Cl. 287—20.5)

This invention relates to the supporting of articles on wall panels, and more particularly to novel supports for this purpose, and to a method and apparatus for affixing such novel supports to wall panels.

Difficulty has been experienced in securing articles to the faces of wall panels by the use of so-called "blind fasteners," in which a portion of the fastener or support is impaled or otherwise inserted in the panel, because of the tendency of the panel to fail to retain the support under loads of any substantial proportions, or under repeated applications of smaller loads. The nature of the failure generally encountered is either the withdrawal of the embedded or inserted portion of the support from the panel, or the failure of the panel structure in the regions against which the inserted portions of the support bear. This tendency toward failure has been found particularly difficult to eliminate when conventional fasteners or supports have been employed in a specific type of panel commercially available for use in industrial applications and in ships, where a lightweight incombustible panel of high insulating value is required. This particular type of panel comprises a solid homogeneous sheet material made of asbestos fiber and an inorganic binder. It can be cut and worked like wood, but will not satisfactorily hold supports of the type where the inserted portion of the support has a relatively small area or several such areas bearing against the surrounding material, under load conditions as discussed above.

It is an object of the present invention to provide a support having a novel means for engagement with the interior of a panel, which means provides a relatively broad area of contact with the adjacent material of the panel and hence distributes the effect of loads on the support over a wider region of the panel.

It is a further object of the invention to provide a novel arrangement for securing such a support to the panel.

A still further object of my invention is to provide a simple method for firmly fixing the panel-engaging portion of the support interiorly of the panel.

Another object of the invention is the production of a novel combination of such a support and a panel member.

A still further object of the invention is to provide a novel tool for use in performing the method of affixing the support to the panel.

Other objects of the invention will become apparent from the following more detailed description, taken in connection with the accompanying drawing, wherein like reference characters designate like parts, and wherein:

Fig. 1 is a side view in partial section taken vertically through a wall panel with a device for supporting an article affixed thereto in a groove directed inwardly from the panel face and having laterally extending recesses near its base;

Fig. 2 is a face view of a panel and support such as shown in Fig. 1, but showing the groove and recesses containing a hardenable, water plasticized material, commonly known as spackle;

Fig. 3 is a view in cross-section similar to that of Fig. 1, but showing a slightly different manner of formation of the groove and insertion of the supporting device in the panel, with spackle in the groove and recesses;

Fig. 4 is an enlarged sectional view of a portion of the construction shown in Fig. 2;

Fig. 5 is a similar enlarged view of a wall panel and a cutting tool at the completion of its travel in cutting the groove and recesses to accommodate the supporting device;

Fig. 6 is an enlarged view in perspective of the head portion of a stud element forming a portion of the supporting device;

Fig. 7 is a face view of an apertured head plate element forming part of the supporting device, with the stud element inserted in the aperture;

Fig. 8 is a side elevation of the cutting tool of Fig. 5; and

Fig. 9 is an end view of the cutting tool, as viewed from the left in Fig. 8.

The novel article supporting device of the present invention is shown generally at 1 and comprises a generally cylindrical stud element 2 having a shank 4 which is preferably threaded to receive a washer 6 and nut 8. The stud has an enlarged head 10 having a portion 12 of greater thickness in one direction than the adjacent portion 14 of the shank. The diametrically opposite portions of the head which form this portion of greater thickness are preferably reduced at the end of the head adjacent the shank to at least the diameter of the shank by arcuately or otherwise tapering off this end of the head, as shown by the area designated 16 in Fig. 6. The purpose of this construction will appear as the description progresses.

The head of the stud also is preferably formed with diametrically opposite substantially parallel flat side surfaces 18 having the planes of their faces extending substantially in the direction of greater thickness of the head previously referred to, and having projections 20 extending laterally outwardly therefrom. The projections are preferably formed upon an axis perpendicular to the side faces, and also normal to a diameter extending through the head in the direction of greater thickness. The projections are conveniently formed adjacent the head of the stud and may be flattened off, along with the head of the stud at the free end of the head, as shown at 22. In their preferred form, the projections are semi-cylindrical in nature, and present the rounded portions 24 of their peripheries toward the shank end of the stud, to provide a fulcrum for the head plate, in a manner to be more particularly described.

The head plate 26 may take various shapes, but preferably is formed flat and includes an aperture 28 shaped complementarily to the outline of the head of the stud taken in cross-section but exclusive of the interruptions in contour provided by the projections, and dimensioned to receive the shank and to fit on the head of the stud, but so as not to pass over the projections. The aperture preferably is given the elongated shape and dimensions relative to the stud shown in Fig. 7, in which it will be clear that the width of the aperture is smaller than the span of the projections, thus preventing the withdrawal of the head plate over the projections and off the head end of the stud. Means are also provided to co-act between the stud head and the head plate to prevent any substantial rotation of the head plate relative to the stud head about the longitudinal axis of the stud. This means may take a variety of forms but is illustrated by the preferred construction in which the complementary shape of the stud head and the aperture of the head plate is non-circular in cross-section, and in which the width of the aperture is also less than the thickness of the portion of greater thickness of the stud head. The significant relationship required between the stud and the head plate is that the head plate must be received on the shank and be slideable to the stud head but not thereover, and must be fulcrumed against the projections or equivalent portions of the stud head for limited angular movement, made possible by the reduced portions 16 previously described, in the direction indicated by the arrows in Fig. 6 about an axis such as shown to be defined by the projections, while it is at the same time held against substantial rotation about the longitudinal axis of the stud.

Referring to Figs. 1, 2, 4, and 5, the purpose of the construction of the article supporting device as just described will become readily apparent. These figures of the drawing also illustrate one method of installing the supporting device in a wall or similar panel 30, Fig. 5 showing the use of the tool illustrated in more detail in Figs. 8 and 9. The first step in the installation of the supporting device in the panel involves the cutting of an elongated groove 31 (31$^1$ in Fig. 3) inwardly from a face of the panel to a depth increasing progressively in the direction of the length. This groove should be made wide enough to accommodate the stud, including the head and projections, with a sliding fit. It may conveniently be made of a uniform width, and slightly wider than the span of the projections. The groove is preferably formed substantially vertically in the panel, either downwardly and inwardly as shown in Fig. 1, or upwardly and inwardly as shown in Fig. 3. A standard router can be used to cut the groove, the commercial type identified as the Stanley No. 2012 serving adequately. The tool employed should have a cutting edge or edges extending over a sufficient portion of its length to cut a groove of the desired depth, and a mandrel portion which may be inserted in a portable electric drill or similar device which will impart a rotative cutting action to the tool.

In practicing the invention, it is necessary to form oppositely disposed laterally directed recesses 32 or 32$^1$ in the side walls 33 of the groove in the panel, preferably close to the base 35 or 35$^1$ of the groove. The recesses should have a depth at least sufficient to receive the head plate with a sliding fit. It is desirable that the head plate should not rotate in the recesses in a plane parallel to their side walls. This can be prevented as illustrated by making the head plate elongated and by flattening off both sides thereof, as shown at 34, or at least one side thereof, or in any other suitable manner.

While it is possible to cut the groove with a standard router as discussed above and to form the recesses subsequently, the process is greatly simplified by the use of the novel tool I have illustrated. In this tool, I have by welding or otherwise secured to the cutting head 36 of a standard router 38 of the type mentioned a flat generally cylindrical second cutting head 40 of larger diameter than the cutting head of the router and having cutting teeth 42 on its circumference. This second cutting head may be the type illustrated by the conventional circular saw shown in the drawings, and is preferably secured to the cutting head of the router with the flat ends 44 of the circular saw substantially perpendicular to the longitudinal axis of the cutting head of the router, at a location between the ends of the cutting edges 46 of the router, and concentrically thereof. The router has a mandrel 48 coaxial with its cutting head for reception in the chuck end 50 of a conventional portable electric drill, not shown in its entirety. A composite cutting tool of the type described can be employed to cut simultaneously the groove and the recesses in the relationship previously described simply by addressing the face of the panel with the tool held at a slight angle and moving the rotating tool forwardly and downwardly in the direction of the arrow shown in Fig. 5, to form the type of groove and recesses illustrated in Figs. 1, 2, 4, and 5, or upwardly when forming the inverted type shown in Fig. 3.

It will be noted that in forming the groove with the composite tool, the location of the recesses relative to the base of the groove is determined by the location of the circular saw relative to the free end of the cutting head of the router. The distance between the base of the groove and the recesses should, in any event, be sufficient to accommodate the free end of the head of the stud and that portion thereof which includes the projections in a manner so that the projections will lie on the side of the recesses adjacent the base of the groove when the stud head is inserted to the base of the groove, so that the head plate can be received in the recesses and the assembled stud and head plate can be slid along the groove to its deeper portion 37 or 37$^1$ at one end.

By using the composite tool of the instant invention, it will be noted that the circular saw cuts the recesses beyond the end of the groove at its deeper end where they merge to form a single recess opening off the end wall 56 or 56$^1$ as indicated at 52 or 52$^1$, thereby providing space to accommodate a corresponding end 54 of the head plate and permitting the stud head to be slid up against that end wall of the groove. The aperture in the head plate is desirably located at a distance from the end 54 thereof approximating the radius of the circular saw, so that this end of the head plate can be entirely received within the recess 52 or 52$^1$. This arrangement provides an important extra bearing surface for the head plate at a region within the panel which has not been weakened at all by the formation of the groove. The length of the head plate in the opposite direction can be considerably greater, so as to increase the bearing surface of the head plate to the desirable extent.

After cutting the groove and recesses, the stud with the head plate assembled thereon in the manner indicated is slipped into the groove at its shallow end, where the recesses open to the face of the panel, with the stud head at the base of the groove and the projections extending transversely of the groove, and with the head plate lying in the recesses. The shank end of the stud, which protrudes from the groove at the panel face, is then grasped, and the assembly slid along the groove to the position shown in Figs. 1–5. The stud is held substantially normal to the panel face, and the washer 6 and nut 8 are placed on the shank of the stud and drawn tightly against the panel face to draw the portions 24 of the projections 20 against the rear face of the head plate and the forward face of the head plate into gripping engagement with the forward side walls 58 or 58$^1$ of the recesses. The stud could, of course, be drawn up and held by means other than the nut and washer.

After the support has been adjusted to place and secured as described, the groove and/or recesses are preferably filled with the hardenable, water plasticized material 60 commonly known as spackle, the visible surface of this material being levelled and smoothed to present a finished appearance.

Supports of the instant invention affixed to panels of the particular type mentioned in a manner herein disclosed have been found very effective in withstanding both downwardly and outwardly applied loads. In actual tests, a straight pull of 240 pounds was withstood before failure. A downward pull at 250 pounds, the limit of loading, produced no failure.

From the above description, it will be evident that I have obtained the objects of my invention. While I have described my invention in rather full detail, it will be understood that these details need not be strictly adhered to but that various changes and modifications may suggest themselves to one skilled in the art, all falling within the scope of the invention as defined by the subjoined claims.

What I claim is:

1. In combination, a wall panel having an elongated groove formed inwardly at an angle from a face thereof and terminating interiorly thereof, a stud in said groove having one end extending therefrom outwardly of said panel face, and means in said groove engageable with the walls of the groove and with the stud at its other end holding the stud against withdrawal from the groove and providing a portion on which the stud is pivotal through and arc extending in the direction of the elongation of the groove, said means cooperating with said stud and the walls of said groove to prevent rotation of the stud about its axis in the groove.

2. In combination, a stud having a shank and a head, projections extending outwardly in opposite directions from opposite sides of the head, a head plate having an aperture fitting the stud head and dimensioned to receive the shank but not to pass over the projections, the thickness of the stud head through that portion of the head adjacent the projections and toward the shank end being reduced in a direction substantially normal to the axis of the projections, whereby said head plate may be fulcrumed on the projections for angular motion about their axis, means co-acting between said stud head and head plate to prevent any substantial rotation of the head plate relative to the stud head about the axis of the stud, a wall panel having a solid section of substantial thickness and an elongated groove formed inwardly from a face thereof and terminating interiorly thereof, said groove having a depth increasing in the direction of its length, the width of the groove being sufficiently greater than that of the stud and the span of the projections to provide clearance for sliding fit of the stud in the groove, the side walls of said groove having oppositely disposed laterally directed recesses of a depth at least sufficient to receive said head plate with said a sliding fit, said stud being situated in the groove in its deeper end with said head plate in said recesses and with the end of the stud opposite the head extending outwardly of the said panel face, and means mounted on the shank of the stud and engaged therewith in longitudinally adjustably fixed relation thereto, said means being engaged against said panel face and, in cooperation with said projections and said head plate, holding said stud securely in said groove.

3. The combination defined in claim 1, and means co-acting between said head plate and said panel to prevent rotation of the head plate in the recesses in a plane parallel to the side walls of the recesses.

4. The combination defined in claim 2, and plastering compound substantially filling said groove.

5. The combination defined in claim 1, in which said recesses extend into the end wall of the groove at its deeper end and receive a portion of said head plate.

6. In combination, a stud having a shank and a head, said head having a portion of greater thickness in one direction than the adjacent portion of the shank, said head having diametrically opposite flat side surfaces having the planes of the faces extending substantially in said one direction, projections extending laterally outwardly from said side surfaces, a head plate having an aperture shaped complementarily to the outline of the head of the stud, exclusive of the interruptions in contour provided by the projections, and dimensioned to receive the shank and to fit on the head of the stud, the width of the aperture being smaller than the span of the projections and less than the thickness of said portion of greater thickness of the stud head, whereby the head plate is held against withdrawal over the head of the stud and fulcrumed on the projections for angular motion about the axis defined by the projections, while being held against substantial rotation relative to the stud head about the axis of the stud, a wall panel having a solid section of substantial thickness and an elongated groove formed inwardly from a face thereof and terminating interiorly thereof, said groove having a depth progressively increasing in the direction of its length, the width of said groove being sufficiently greater than that of the stud and the span of the projections to provide clearance for sliding fit of the stud in the groove, the side walls of said groove having oppositely disposed laterally directed recesses of a depth at least sufficient to receive said head plate with a sliding fit, said stud being situated in said groove at its deeper end with said head plate in said recesses and with the end of the stud opposite the head extending outwardly of the panel face, said head plate having a flat edge portion generally parallel to the base of the corresponding recess, to prevent rotation of the head plate in said recesses in a plane generally parallel to the walls of said recesses, and means mounted on the shank of the stud and engaged therewith in longitudinally adjustably fixed relation thereto, said means, with said projections and head plate, holding said stud securely in said groove.

References Cited in the file of this patent

UNITED STATES PATENTS

| | | |
|---|---|---|
| 133,463 | Long | Nov. 26, 1872 |
| 589,699 | Coom | Sept. 7, 1897 |
| 871,670 | Calbeck | Nov. 19, 1907 |
| 1,079,445 | Smith | Nov. 25, 1913 |
| 1,199,743 | Gadd | Sept. 26, 1916 |
| 1,596,603 | Enoch | Aug. 17, 1926 |
| 2,126,630 | Gleitsman | Aug. 9, 1938 |
| 2,246,457 | Schultz | June 17, 1941 |
| 2,461,145 | Craver | Feb. 8, 1949 |
| 2,636,414 | Bedford | Apr. 28, 1953 |
| 2,693,372 | Ludwig et al. | Nov. 2, 1954 |

UNITED STATES PATENT OFFICE

CERTIFICATE OF CORRECTION

Patent No. 2,804,321                               August 27, 1957

George P. Walker

It is hereby certified that error appears in the printed specification of the above numbered patent requiring correction and that the said Letters Patent should read as corrected below.

Column 5, line 33, strike out "said", second occurrence; lines 42 and 48, for the claim reference numeral "1" read -- 2 --, in each occurrence, line 46, for the claim reference numeral "2" read -- 3 --.

Signed and sealed this 29th day of October 1957.

(SEAL)
Attest:
KARL H. AXLINE

Attesting Officer

ROBERT C. WATSON
Commissioner of Patents